US00RE37264E

(19) United States
(12) Reissued Patent
Chen et al.

(10) Patent Number: US RE37,264 E
(45) Date of Reissued Patent: Jul. 3, 2001

(54) PASTA FILATA-SIMULATIVE CHEESE PRODUCT AND METHOD OF MAKING

(75) Inventors: Carol M. Chen; Mark E. Johnson, both of Madison, WI (US)

(73) Assignee: Wisconsin Alumni Research Foundation, Madison, WI (US)

(21) Appl. No.: 09/522,762

(22) Filed: Mar. 10, 2000

Related U.S. Patent Documents

Reissue of:
(64) Patent No.: 5,942,263
Issued: Aug. 24, 1999
Appl. No.: 08/854,193
Filed: May 9, 1997

U.S. Applications:
(60) Provisional application No. 60/020,245, filed on Jun. 21, 1996.

(51) Int. Cl.[7] ..... A23C 9/12
(52) U.S. Cl. ..... 426/38; 426/36; 426/39; 426/40; 426/42; 426/43
(58) Field of Search ..... 426/36, 38, 39, 426/40, 42, 43

(56) References Cited

U.S. PATENT DOCUMENTS 3,117,008 * 1/1964 Mauk ..... 99/116
3,692,540 * 9/1972 Mark ..... 99/116
5,094,873 * 3/1992 Kerrigan et al. ..... 426/582
5,626,893 * 5/1997 Reddy ..... 426/36

FOREIGN PATENT DOCUMENTS

2043757 * 3/1971 (DE) .
0312359 * 4/1989 (EP) .
2591433 * 12/1985 (FR) .

OTHER PUBLICATIONS

Villani et al., Stal. J. Food Sci., vol. 7(3), p. 221–234, 1995.*
Shukla et al., Ind. J. Dairy Sci., vol. 42(3), p. 601 to 605, 1989.*
Merrill et al., J. Dairy Sci., vol. 77, p. 1783–1789, 1994.*
Banks et al., Milchwissenschaft, vol. 42, No. 4 p. 212–215, 1987.*

* cited by examiner

*Primary Examiner*—Chhaya D. Sayala
(74) *Attorney, Agent, or Firm*—DeWitt Ross & Stevens S.C.

(57) ABSTRACT

A method of manufacturing cheese which is simulative of pasta filata cheeses, but which does not require a mixing and/or molding step, and the cheese product produced by the method, are disclosed. The method includes the steps of pre-acidifying milk; ripening the milk with a mesophilic starter culture to yield cheese milk; coagulating the cheese milk by adding a coagulant to yield a coagulum; cutting the coagulum to yield curds and whey; separating the curds from the whey and washing the curds in water; and proceeding directly to salt, hoop, and press the curds in the absence of any milling, mixing, or molding of the curds.

30 Claims, No Drawings

PASTA FILATA-SIMULATIVE CHEESE PRODUCT AND METHOD OF MAKING

Matter enclosed in heavy brackets [ ] appears in the original patent but forms no part of this reissue specification; matter printed in italics indicates the additions made by reissue.

This application claims priority to provisional application Ser. No. 60/020,245, filed Jun. 21, 1996.

FIELD OF THE INVENTION

The present invention is directed to a cheese, specifically a new form of pizza cheese similar to Mozzarella cheese.

DESCRIPTION OF THE PRIOR ART

Mozzarella cheese is the fastest growing cheese market in the U.S. today, primarily due to the increased consumption of both fresh and frozen pizza. Mozzarella's clean mild flavor, favorable shredding, and appealing melt and stretch characteristics make it well suited for use on pizza. Mozzarella cheese is a member of the pasta filata group of cheeses. Like other pasta filata cheeses, the curd is mechanically heated, stretched and molded under hot water. This heat treatment inactivates residual milk coagulant and reduces starter populations, decreasing the potential for casein hydrolysis in the cheese during refrigerated storage. Mozzarella's unique characteristics of both good melt and stretch are related to its pH and the heat treatment it receives as the curd goes through the mixer. This process helps give Mozzarella its characteristic stretch and "stringiness." The pasta filata process requires a specialized and expensive piece of equipment called a mixer molder. Mozzarella is also traditionally made with a brine step, creating a brine disposal problem. It is believed that the good stretch, good meltability, and good shredability of Mozzarella is due to its composition, the final pH and limited proteolysis.

Other cheeses can be used on pizzas, however they need to function like Mozzarella. For example, Cheddar cheese may have wonderful flavor, but its functional characteristics when melted are not well suited. A very young Cheddar stretches well after heating, but only softens and does not flow. After three months of aging, it flows nicely, but no longer stretches.

SUMMARY OF THE INVENTION

The present invention is directed to a method of manufacturing pasta filata-simulative cheeses and the resultant cheeses produced by the method. The method does not require a mixing or molding step which is required of traditional Mozzarella and other pasta filata cheeses. The method of the present invention comprises first pre-acidifying milk. The pre-acidified milk is then ripened with a mesophilic starter culture to yield cheese milk. The cheese milk is then coagulated by adding a coagulant to yield a coagulum. The coagulum is then cut and the curds separated from the whey. The curds are then washed in water. At this point, the method calls for proceeding directly to salt, hoop, and press the curds in the absence of any milling, mixing, or molding of the curds. The cheese produced by the process is remarkable similar to traditional pasta filata cheeses in both functional and organoleptic qualities.

One object of this invention is to provide a pizza cheese that has comparable flavor and functional characteristics to Mozzarella, but which does not require a mixer molder or a brining step during its manufacture.

Another aspect of the present invention is a manufacturing process for a high moisture, 25% to 75% reduced-fat pizza cheese which is not run through a mixer molder. The cheese has functional qualities (melt and stretch) similar to conventional Mozzarella cheese.

A direct comparison between a 25% reduced-fat pizza cheese according to the present invention and a conventional low moisture, part-skim (LMPS) Mozzarella, as well as a comparison between a 50% reduced-fat pizza cheese according to the present invention and a conventional 75% reduced-fat Mozzarella revealed no differences in the overall performance (melt, stretch and flavor preference) between the cheeses.

Functional Advantages

The resulting pizza cheese is similar in moisture, fat, salt, total protein, and pH to conventional Mozzarella made in the traditional fashion. The pizza cheese maintains a 10-inch "stretch" through three months and has melt characteristics similar to Mozzarella. The following differences were also noted between the pizza cheese of the present invention and conventional Mozzarella:

1) The pizza cheese does not turn brown when heated. Due to the starter culture used and an altered manufacturing protocol, the pizza (cheese has no residual sugar and will not brown during baking.

2) The pizza cheese is whiter than Mozzarella. Smaller and more numerous fat globules reflect more light, giving the pizza cheese an extremely white appearance. Due to the whiter appearance, the taste panel commented that it looked like there was more cheese on the pizza.

3) The pizza cheese is less chewy when young than conventional Mozzarella.

4) The pizza cheese exhibits 50% less 'oiling off' when heated. During the mixing process for conventional LMPS Mozzarella, heat and mixing permit the fat to coalesce and water to pool around the protein strands. In the subject pizza cheese manufacturing process, a mixer and high temperatures are not used. Consequently, the fat globules do not coalesce and they remain smaller within the cheese matrix. Thus, the fat in the pizza cheese is less likely to pool during pizza baking.

5) The pizza cheese is more homogeneous than Mozzarella.

6) The pizza cheese exhibits less flow than Mozzarella.

7) The pizza cheese exhibits fewer blisters when heated than Mozzarella. The pizza cheese contains smaller pockets of water, which produce fewer blisters than LMPS Mozzarella. When heated, the smaller pockets of water do not produce enough steam to make a blister, or bubble on the cheese surface.

8) The pizza cheese yields shorter shreds and more Fines when shredded.

Commercial Advantages

The cheese manufacturing process of the present invention benefits cheesemakers in two ways: First, it allows manufacturers of stirred curd cheese varieties (i.e., Cheddar, Colby, Brick, Monterey Jack, Muenster) to expand into the growing pizza cheese market with a minimal purchase of equipment. This gives cheesemakers the capability of manufacturing a new variety of cheese with the same functional characteristics as LMPS Mozzarella. And because the manufacturing process does not require the mixer molder and brine systems needed to manufacture traditional Mozzarella, producing the present pizza cheese is economically advantageous from a capital expenditure view point.

Second, as noted, above, the fat retention increases from about 86 to 92%, giving cheesemakers higher cheese yields.

It is estimated that this higher yield translates to 109 lbs. of additional cheese per 50,000 lbs. of milk as compared to the conventional manufacturing of Mozzarella. This, of course, is economically advantageous from a profit margin view point.

Further advantages of the invention will appear from a complete reading of the Detailed Description, below.

DETAILED DESCRIPTION OF THE INVENTION

The present invention is specifically directed to a process of cheese making in which the moisture level in the cheese is controlled by pre-acidifying the milk, using a short manufacturing time, and washing the curd. Additionally, the typical milk coagulant level is decreased by at least 50% and a mesophilic rather than a thermophilic starter culture is used.

The resulting cheese is similar in composition to low moisture, part-skin Mozzarella (47% moisture, 22.3% fat, pH at 1 month 5.2) and 50% reduced-fat Mozzarella cheese (54.5% moisture, 8.5% fat, pH at 1 month 5.15).

Raw Milk

The process can start with milk having a relatively wide range of fat content, from 0.07% (virtually fat-free) to 3.6%. The preferred milk for the cheese of the present invention is termed "low moisture part skim" (LMPS:) milk, which has a milkfat content of approximately 2.3%. An alternative milk is termed "lowerfat" (LF), which has a milkfat content of approximately 0.70%. Additionally, cheese from whole milk can be made. Whole milk generally has a milkfat content of 3.5%. Raw milk has a pH of about 6.64.

Milk can be "standardized" to a preferred milkfat content. For example, if the starting milkfat level exceeding the desired level, the milk can be standardized to decrease the level. Standardization is a process well-known to the art. In essence, lowering the milkfat levels increases the milk protein level. Therefore, one way of interpreting standardization is to "increase" the protein-to-fat ratio in milk.

Pre-acidify the Milk

The pre-acidification step is optional and primarily intended to shorten the "make schedule." "Make schedule" is a cheese processing term which refers to the time of manufacturing the cheese. The purpose of the pre-acidification step is to lower the pH of milk to from approximately 6.65 to approximately 6.30. There are a variety of acids which can be used in this step. Acetic acid is preferred because it is prevalent and economical. Lactic acid can also be used. Preferably, sufficient amount of acid is added to lower the pH to approximately 6.30. The acidified milk is left for a few hours (overnight) to equilibrate.

Pasteurization Step

The milk is then pasteurized under normal conditions at a temperature of approximately 164° F. (73° C.) for 16 seconds according to well-known processes in the art.

Add Starter Culture

If the pre-acidification step is omitted, the starter culture is allowed to process in the milk for a longer period of time to build up the acidity level. The pH level must be lowered to approximately 6.30 before the coagulant is added.

The starter is added to the pasteurized milk (pH 6.30) and cooked at temperature of 94° F. (35° C.) for approximately 1½ hours to reduce the pH to approximately 6.25.

Mesophilic (Lactococcus species) culture is preferred over a thermophilic (Lactobacillus species) starter culture. Examples of a mesophilic culture is the Lactococcus genera. In cheese making processes using a mesophile, optimum acid development occurs at around 30° C.–32° C. Using mesophiles is important for another reason. Optimally, white Mozzarella-like cheeses should be made to result in no residual sugar. Milk sugar is a disaccharide comprising galactose and glucose. Thermophiles do not ferment galactose. Therefore, some of the milk sugars remain. When the curd is cooled to a storing temperature, residual sugar remains. Mesophilic cultures ferments all the sugars in the milk even under cold storage conditions, leaving no residual sugar.

Non-limiting examples of starters which can be used in this process include Lactococcus lactic ssp. cremoris and lactis. It is within the scope of this invention to use a blend of different starters, even thermophilic starters, as long as the milk sugars are completely fermented.

Starter culture is typically added at 72 ml starter/1000 lb. milk for a direct vat set type starter or 0.75% (wt/wt) for a bulk set type starter.

Add Coagulant

The level of coagulant used in this process is approximately 50% of the typical milk coagulant level. The coagulant is a proteolytic enzyme. The milk coagulant's primary responsibility is to clot the milk for the formation of curd. However, after the curd is formed, some milk coagulant is retained and will continue to breakdown the protein throughout aging. By using about half the amount of milk coagulant, there will be less residual milk coagulant activity in the finished cheese. It is believed that this limits the breakdown of protein during aging, so the cheese can maintain its elasticity when heated (stretch).

An example of a 100% pure chymosin is MAXIREN (Gist Brocades, King of Prussia, Pa.). Another example of 100% pure chymosin is CHYMAX (Pfizer Corporation, Milwaukee, Wis.). Other coagulants are known to the art. The coagulant is added in amounts of approximately 0.575 oz. double strength coagulant/1000 lbs milk. The coagulant is left in the milk product for approximately 25 minutes, a normal setting time for coagulants. The reason why the set time does not change is that the step is starting out with a lower than normal pH and a warmer temperature.

Cutting Process

Approximately 1 hour and 55 minutes after the starter culture has been added or 25 minutes after the coagulant has been added, the cutting process is initiated. Cutting is well-known to art. The preferred cutting process utilizes wire knives (⅜ in a conventional horizontal vat. It is necessary to cut in large curds, comparable to standard Mozzarella cutting processes, which results in increased moisture in the cheese. The curd is allowed to sit quiescently for 5 minutes to heal.

A portion of whey can be removed after cutting and water added back to decrease lactose concentration in the curd and to help achieve a final pH similar to that of Mozzarella cheese.

Cooking

The cooking temperature is 98° F. (37° C.), which is lower than for standard Mozzarella processes, primarily because mesophilic starters are being used. In fact, the cooking step can be eliminated. The starter temperature is; already 94° F. The temperature range should not deviate from about 90° F. to about 101° F. to protect the mesophilic starter culture. During the cooking step the starter culture further reduces the pH of the product to 6.15 for whey and 6.00 for curds. The cooking step proceeds for approximately 25 minutes.

Separating Curds From Whey

Following the cooking step, the curds are physically separated from the whey, an approximate 10 minute step.

Add Cold Water

Washing or rinsing the curd removes sugar, acid, and minerals. The pH at which the curd is washed is critical to the success of this protocol, as is the pH at which the coagulant is added. Cold water (approximately 65° F.) is then added to reduce the temperature of the curds to approximately 75° F. The end pH of the curds is typically between 5.8 and 6.0, preferably 5.9. The cool water bath also assists in retaining the high moisture content of the cheese.

Drain water

The water is then drained which further removes sugar, acid and minerals.

Add Salt

Salt is then added to taste, approximately 2.5 lb./1000 lb milk. The salt is preferably directly added rather by using a brine bath, although the brine bath could be used. Salt is added approximately 3 hours and 5 minutes following the addition of the starter culture.

Hoop and Press Steps

The hoop and press steps are well known to the art. For example, reference is made to standard cheddar processes for a description of these processes. The cheese is pressed for approximately 3–4 hours at 25 psi.

EXAMPLES

Cheese making trials were conducted to develop a non-pasta filata type cheese suitable for use on pizzas. The developed manufacturing protocol incorporated mesophilic cultures, pre-acidification of milk, decreased milk coagulant levels, a firm milk coagulum at cutting, and a cool water rinse. Summaries of the make schedules for triplicate runs of a 25% reduced-fat pizza cheese and a 75% reduced-fat cheese according to the present invention are presented in Tables 3 and 4. The resulting cheeses were similar in composition to low moisture, part-skim (LMPS) Mozzarella (47% moisture, 22.3% fat, pH at 1 month 5.2) and 50% reduced-fat (LF) Mozzarella (54.5% moisture, 8.5% fat, pH at 1 month 5.15), respectively. The make schedules for triplicate runs of standard LMPS Mozzarella and LF Mozzarella, which were used for comparison purposes, are presented in Tables 5 and 6.

Experiments were conducted to evaluate the functional and sensory characteristics of stretched and non-stretched cheeses. At both fat levels, Hunterlab calorimeter L values were higher and +b values lower for the non-stretched cheeses. Visually these cheeses were whiter and less yellow in color than traditional Mozzarella. The non-stretched pizza cheeses exhibited 40% less oiling off through 1 month of aging than their counterpart Mozzarella. At the lower fat level, both stretched and non-stretched cheeses did oil off. At the higher fat level, the stretched cheeses showed 25% more flow at 12 min in thermal melt assays than Mozzarella. At the lower fat level thermal cheese melt did not differ. In addition, no differences were observed in microwave melt tests at both fat levels in stretched and non-stretched cheeses.

Panels of experienced judges evaluated cheeses at 1 week and 1 month for shredability, appearance, flavor, body, and overall acceptance when baked on a pizza. The non-stretched cheese shreds tended to be shorter, more brittle and contain more fines than stretched cheese shreds. When baked on a pizza, the non-stretched pizza cheeses had similar shred fusion, less blisters, and equal Mozzarella flavor quality. However, these cheeses significantly ($P<0.05$) differed in chewiness, with the non-stretched pizza cheeses being less chewy or more fluid throughout aging. Using a category scaling of 1 to 7 (1=highly unacceptable, 4=neither acceptable nor unacceptable, and 7=highly acceptable) judges scored higher fat pizza cheeses at 5 or 6 and lower fat pizza cheese at 4 or 5.

COMPARATIVE EXAMPLES

Reduced Fat Pizza Cheese Manufactured Using Two Different pH Levels

Comments on reduced fat pizza cheese manufactured using two different pH levels at addition of the milk coagulant are included in Table 1. This type of approach to attain high moisture levels was effective in the manufacture of a high moisture lower fat Mozzarella cheese (moisture contents ranged from 55 to 59%). However, due to different starter culture acid production and total manufacturing times, resulting cheeses were too low in moisture. In addition, the whey dilution step during cheesemaking was inadequate and final cheese pH values after 1 month were too low. These cheeses were tough and dry when evaluated at room temperature and lacked appropriate stretch and melt characteristics on the pizza pies. Taste panelists also noted a high degree of oiling off on the 25% reduced fat cheeses. This was attributed to pH and residual milk coagulant activity.

TABLE 1

Manufacture of reduced fat pizza cheese[1] using a lower pH at addition of milk coagulant.

| pH at addition of coagulant | pH at draining | Cheese moisture | Cheese pH at 1 month | Comments (Pertain to all cheeses) |
|---|---|---|---|---|
| 25% reduced fat pizza cheese[2] | | | | 1. too low in moisture |
| 6.20 | 5.70 | 40% | 4.95 | 2. too low in pH |
| 6.05 | 5.35 | 41% | 4.90 | 3. cheese tough & dry |
| 75% reduced fat pizza cheese[3] | | | | 4. cheeses lacked |
| 6.20 | 5.75 | 46% | 4.90 | appropriate stretch & |
| 6.05 | 5.40 | 48% | 4.90 | melt characteristics |
| | | | | 5. cheeses too high in salt |
| | | | | 6. 25% reduced fat pizza cheese too much oiling off |

[1]20% predraw/10% water added back to the whey
[2]Cheese Fat = 26%, FDM = 44.6%
[3]Cheese Fat = 9.5%, FDM = 18.0%

The second manufacturing approach was based on the 50% reduced fat Cheddar manufacturing schedule developed at the Center of Dairy Research (CDR) (Madison, Wis.). This manufacturing technique, in combination with a 50% predraw/30% water addition to the whey and homogenization of part skim milk prior to pasteurization, are summarized in Table 2. For the 75% reduced fat pizza cheese a cold water curd rinse was done prior to salting. Resulting cheese moisture contents were lower than targeted. In addition, the 75% reduced fat pizza cheese was too bland in flavor, had a plastic appearance after melting, and the cheese strands fractured too readily during stretching.

TABLE 2

Manufacture of a reduced fat pizza cheese[1] using a manufacturing protocol similar to that of 50% reduced fat Cheddar.

| Homogenization[2] of milk | Cheese moisture | Cheese pH at 1 week | Cheese pH at 1 month | Comments (Pertain to all cheeses) |
|---|---|---|---|---|
| 25% reduced fat pizza cheese[3] | | | | 1. too low in moisture |
| no | 42.5% | 5.21 | 5.37 | 2. no browning on pizzas |
| yes | 44.5% | 5.17 | 5.30 | 3. all cheeses had acceptable stretch and shredability |
| 75% reduced fat pizza cheese[4] | | | | |
| no | 51.0% | 5.20 | 5.47 | |
| yes | 50.0% | 5.24 | 5.50 | 4. less meltable than LMPS Mozzarella |
| | | | | 5. 25% reduced fat pizza cheese vs LMPS Mozzarella, no difference in preference |

[1]50% predraw/30% water added back to the whey
[2]Homogenization of part-skim milk prior to pasteurization = 500/500 psi
[3]Cheese Fat = 23.5%, FDM = 41%
[4]Cheese Fat = 8%, FDM = 17%

The 25% reduced fat pizza cheese was compared directly to low moisture, part-skim (LMPS) Mozzarella cheese of equal age, with no significant difference in the overall preference being noted. Other observations from this series of experiments included no browning on pizza pies, a good cheese salt content, very little or no oiling off and an acceptable degree of stretching for an cheese (stretch ranged from 5 to 24 inches).

As noted above, the Tables 3 through 6 present the following information:

Table 3: Triplicate Examples of the preferred manufacturing protocol for a 25% reduced-fat pizza cheese according to the present invention.

Table 4: Triplicate Examples of the preferred manufacturing protocol for a 75% reduced-fat pizza cheese according to the present invention.

Table 5: Triplicate Examples of a conventional manufacturing protocol for low moisture, part-skim (LMPS) Mozzarella cheese.

Table 6: Triplicate Examples of a conventional manufacturing protocol for 50% reduced-fat (LF) Mozzarella cheese.

Table 7: The compositional results for the cheeses manufactured in Tables 3 through 6.

TABLE 3

| | Vat 1 (112095-1) | | | Vat 2 (112095-2) | | |
|---|---|---|---|---|---|---|
| Operation | Time (min) | | pH or TA | Time (min) | | pH or TA |
| Initial Milk | initial Milk | 2.41% | | | | |
| | (Lynn), | TA | 0.20 | | TA | 0.20 |
| | 600 lb | pH | 6.32 | 600 lb | pH | 6.32 |
| Add Starter | 0 | Temp | 94.8° F. | 0 | Temp | 94.4° F. |
| Chr. Hansen's 970 (DVS) lot 24085 | | TA | — | | TA | — |
| 72 ml/1000 lbs or 45 ml | 43 ml | pH | — | 43 ml | pH | — |
| Add Coagulant | 90 | Temp | 94.2° F. | 90 | Temp | 94.1° F. |
| Maxiren, Glst Brocades, dbl sir | | TA | 0.22 | | TA | 0.22 |
| 0.58 oz/1000 lbs or 17 ml/1000 lbs | 10 ml | pH | 6.23 | 10 ml | pH | 6 |
| Cut | 113 | TA | 0.12 | 114 | TA | 0.12 |
| ⅜" knives | | pH | 6.20 | | pH | 6.21 |
| Start Cooking | 125 | Temp | 93.5° F. | 125 | Temp | 93.4° F. |
| Reach Cooking Temp | 140 | Temp | 98.5° F. | 140 | Temp | 98.4° F. |
| | | TA | 0.13 | | TA | 0.15 |
| | | w-pH | 6.12 | | w-pH | 6.15 |
| | | c-pH | 5.99 | | c-pH | 6.00 |
| Drain | 140 | | | 140 | | |
| End Drain | 150 | | | 150 | | |
| Add Cold Water | 165 | c-pH | 5.90 | 165 | c-pH | 5.92 |
| | | water temp | 62° F. | | water temp | 62° F. |
| | | curd/water | 74.5° F. | | curd/water | 74.8° F. |
| Drain Cold Water | 180 | c-pH | 5.95 | 180 | c-pH | 5.85 |
| Add Salt | 195 | | | 195 | | |
| 2.5 lbs/1000 lbs or 1135 g/1000 lbs | | salt wt. | 681 g | | salt wt. | 681 g |
| Hoop | 210 | c-pH | 5.66 | 210 | c-pH | 5.57 |
| Press - In | 225 | | | 225 | | |
| - Out | 525 | | | 480 | | |
| Total Time in Press | 300 | (5 h) | | 255 | (4 h, 15 min) | |
| Make Time (Coagulation to Hooping): | 120 | (2 h) | | 120 | (2 h) | |

| | Vat 3 (112095-3) | | | LMPS Pizzarella Mean | | |
|---|---|---|---|---|---|---|
| Operation | Time (min) | | pH or TA | Time (min) | | pH or TA |
| Initial Milk | | | | | | |
| | TA | 0.20 | | | TA | 0.20 |
| | 600 lb | pH | 6.32 | 600 lb | pH | 6.32 |
| Add Starter | 0 | Temp | 94.3° F. | 0 | Temp | 94.5° F. |
| Chr. Hansen's 970 (DVS) lot 24085 | | TA | — | | TA | — |
| 72 ml/1000 lbs or 45 ml | 43 ml | pH | — | | pH | — |
| Add Coagulant | 90 | Temp | 94.5° F. | 90 | Temp | |
| Maxiren, Glst Brocades, dbl sir | | TA | 0.22 | | TA | 0.22 |
| 0.58 oz/1000 lbs or 17 ml/1000 lbs | 10 ml | pH | 6.24 | | pH | 6.24 |
| Cut | 113 | TA | 0.14 | 113 | TA | 0.13 |

TABLE 3-continued

| | | | | | | |
|---|---|---|---|---|---|---|
| ⅜" knives | | pH | 6.20 | | pH | 6.20 |
| Start Cooking | 125 | Temp | 93.6° F. | 125 | Temp | 93.5° F. |
| Reach Cooking Temp | 140 | Temp | 98.3° F. | 140 | Temp | 98A° F. |
| | | TA | 0.14 | | TA | 0.14 |
| | | w-pH | 6.14 | | w-pH | 6.14 |
| | | c-pH | 5.99 | | c-pH | 5.99 |
| Drain | 140 | | | 143 | | |
| End Drain | 150 | | | | | |
| Add Cold Water | 165 | c-pH | 5.92 | 165 | c-pH | 5.91 |
| | | water temp | 62° F. | | water temp | 62° F. |
| | | curd/water | 75° F. | | curd/water | 74.8° F. |
| Drain Cold Water | 180 | c-pH | 5.87 | 180 | c-pH | 5.89 |
| Add Salt | 195 | | | 195 | | |
| 2.5 lbs/1000 lbs or 1135 g/1000 lbs | | salt wt. | 681 g | | | |
| Hoop | 210 | c-pH | 5.57 | 210 | c-pH | 5.60 |
| Press - In | 235 | | | 228 | | |
| - Out | 435 | | | 480 | | |
| Total Time in Press | 200 | (3 h, 20 min) | | 252 | (4 h, 12 min) | |
| Make Time (Coagulation to Hooping): | 120 | (2 h) | | 120 | (2 h) | |

TABLE 4

| | Vat 1 (1120954) | | | Vat 2 (112095.5) | | |
|---|---|---|---|---|---|---|
| Operation | Time (min) | | pH or TA | Time (min) | | pH or TA |
| Initial Milk | Initial Milk | | 81% | raw side babcock, added skim | | |
| | (Lynn), | TA | — | | TA | — |
| | 615 lb | pH | — | 615 lb | pH | — |
| Add Starter | 0 | Temp | 90.1° F. | 0 | Temp | 90.3° F. |
| Chr. Hansen's 970 (DVS) lot 24085 | | TA | 0.21 | | TA | 0.21 |
| 72 ml/1000 lbs | 44 ml | pH | 6.30 | 44 ml | pH | 6.30 |
| Add Coagulant | 100 | Temp | 90.2° F. | 100 | Temp | 90.4° F. |
| Maxiren, Glst Brocades | | TA | 0.22 | | TA | 0.22 |
| 0.58 oz/1000 lbs or 17 ml/1000 lbs | 10 ml | pH | 6.21 | 10 ml | pH | 6.21 |
| Cut | 125 | TA | 0.14 | 123 | TA | 0.13 |
| ⅜" knives | great set | pH | 6.18 | great set | pH | 6.17 |
| Start Cooking | 135 | Temp | 89.3° F. | 135 | Temp | 89.2° F. |
| Reach Cooking Temp | 150 | Temp | 96.2° F. | 150 | Temp | 96.1° F. |
| | | TA | 0.15 | | TA | 0.15 |
| | | w-pH | 6.12 | | w-pH | 6.12 |
| | | c-pH | 5.97 | | c-pH | 5.99 |
| Drain | 150 | | | 150 | | |
| End Drain | 160 | | | 160 | | |
| Add Cold Water | 175 | c-pH | 5.92 | 175 | c-pH | 5.80 |
| | | water temp | 62° F. | | water temp | 63° F. |
| | | curd/water | 74.0° F. | | curd/water | 73.5° F. |
| Drain Cold Water | 190 | | | 190 | | |
| | | c-pH | 5.78 | | c-pH | 5.76 |
| Add Salt | 205 | | | 205 | | |
| 2.5 lbs/1000 lbs or 1135 s/1000 lbs | | salt wt. | 558 g | | salt wt. | 558 g |
| Hoop | 220 | c-pH | 5.73 | 220 | c-pH | 5.71 |
| Press - In | 235 | | | 235 | | |
| - Out | 445 | | | 415 | | |
| Total Time In Press | 210 | (3, 30 min) | | 180 | (3 hr) | |
| Make Time (Coagulation to Hooping): | 120 | (2 h) | | 120 | (2 h) | |

| | Vat 3 (112095-6) | | | LF Pizzarella Mean | | |
|---|---|---|---|---|---|---|
| Operation | Time (min) | | pH or TA | Time (min) | | pH or TA |
| Initial Milk | | | | | | |
| | | TA | — | | TA | |
| | 620 lb | pH | — | 617 lb | pH | |
| Add Starter | 0 | Temp | 89.8° F. | 0 | Temp | 90.1° F. |
| Chr. Hansen's 970 (DVS) lot 24085 | | TA | 0.21 | | TA | 0.21 |
| 72 ml/1000 lbs | 44 nsl | pH | 6.30 | | pH | 6.30 |
| Add Coagulant | 100 | Temp | 90.2° F. | 100 | Temp | 90.3° F. |
| Maxiren, Glst Brocades | | TA | 0.21 | | TA | 0.21 |
| 0.58 oz/1000 lbs or 17 ml/1000 lbs | 10 ml | pH | 6.21 | | pH | 6.21 |
| Cut | 122 | TA | 0.13 | 123 | TA | 0.13 |
| ⅜" knives | great set | pH | 6.14 | | pH | 6.16 |
| Start Cooking | 130 | Temp | 89.0° F. | 133 | Temp | 89.2° F. |
| Reach Cooking Temp | 145 | Temp | 96.2° F. | 148 | Temp | 96.2° F. |
| | | TA | 0.16 | | TA | 0.15 |
| | | w-pH | 6.08 | | w-pH | 6.11 |
| | | c-pH | 5.88 | | c-pH | 5.95 |

TABLE 4-continued

| | | | | | | |
|---|---|---|---|---|---|---|
| Drain | 145 | | | 148 | | |
| End Drain | 155 | | | | | |
| Add Cold Water | 170 | c-pH | 5.86 | 173 | c-pH | 5.86 |
| | | water temp | 63° F. | | water temp | 63° F. |
| | | curd/water | 74.8° F. | | curd/water | 74.1° F. |
| Drain Cold Water | 185 | | | 188 | | |
| | | c-pH | 5.71 | | c-pH | 5.75 |
| Add Salt | 200 | | | 203 | | |
| 2.5 lbs/1000 lbs or 1135 s/1000 lbs | | salt wt. | 563 g | | salt wt. | 600 g |
| Hoop | 215 | c-pH | 5.68 | 218 | c-pH | 5.71 |
| Press - In | 230 | | | 233 | | |
| - Out | 390 | | | 417 | | |
| Total Time In Press | 160 | (2 hr, 40 min) | | 183 | (3 hr) | |
| Make Time (Coagulation to Hooping): | 115 | (2 h) | | 218 | (2 h) | |

TABLE 5

| | Vat 1 (112195-1) | | | Vat 2 (112195-2) | | |
|---|---|---|---|---|---|---|
| Operation | Time (min) | | pH or TA | Time (min) | | pH or TA |
| Initial Milk | Milkfat | 2.41% | | | | |
| | (past, Lynn), | TA | 0.15 | | TA | 0.15 |
| | 615 lb | pH | 6.64 | 615 lb | pH | 6.64 |
| Add Starter 1.5% (wt/wt) | 0 | Temp | 94.8° F. | 0 | Temp | 94.3° F. |
| 1:1 C90, R160 (Thermolac) | | TA | 0.17 | | TA | 0.17 |
| 3405 g each per 1000 lbs milk | 2094 g each | pH | 6.59 | 2094 g each | pH | 6.59 |
| Add Coagulant | 55 | Temp | 94.1° F. | 55 | Temp | 94.3° F. |
| Maxiren, Gtst Brocades, dbl str | | TA | 0.18 | | TA | 0.18 |
| 1.15 oz/1000 lbs or 34 ml/1000 lb | 21 ml | pH | 6.52 | 21 ml | pH | 6.52 |
| Cut | 79 | TA | 0.10 | 78 | TA | 0.10 |
| ⅜" knives | | pH | 6.48 | | pH | 6.47 |
| Start Cooking | 95 | Temp | 93.2° F. | 95 | Temp | 93.2° F. |
| Reach Cooking Temp | 125 | Temp | 105.9° F. | 125 | Temp | 105.8° F. |
| | | TA | 0.11 | | TA | 0.11 |
| | | w-pH | 6.34 | w-pH | 6.33 | |
| | | c-pH | 6.18 | c-pH | 6.17 | |
| Drain | 155 | TA | 0.16 | 155 | TA | 0.15 |
| | | w-pH | 6.15 | | w-pH | 6.14 |
| | | c-pH | 5.87 | | c-pH | 5.90 |
| Cut and Turn | 165 | TA | 0.22 | 170 | TA | 0.17 |
| Stack 2 high immediately | | c-pH | 5.77 | | c-pH | 5.73 |
| Mill | 210 | TA | — | 210 | TA | 0.24 |
| | | c-pH | 5.27 | | c-pH | 5.22 |
| Add Salt | 220 | curd wt | 61 lb | 215 | curd wt | 61 lb |
| 3.0% by curd weight | | salt wt | 831 g | | salt wt | 831 g |
| Mixer 170° F. | 232 | c-pH | 5.22 | 227 | c-pH | — |
| 10% brine | | | | | | |
| Mixer Speed 50 | | see additional sheet | | | see additional sheet | |
| Make Time (Coagulation to Mixer) | 177 | (2 h, 57 min) | | 172 | (2 h, 52 min) | |

| | Vat 3 (112195-3) | | | LMPS Pizzarella Mean | | |
|---|---|---|---|---|---|---|
| Operation | Time (min) | | pH or TA | Time (min) | | pH or TA |
| Initial Milk | | | | | | |
| | | TA | 0.15 | | TA | 0.15 |
| | 615 lb | pH | 6.64 | 615 lb | pH | 6.64 |
| Add Starter 1.5% (wt/wt) | 0 | Temp | 94.3° F. | 0 | Temp | 94.4° F. |
| 1:1 C90, R160 (Thermolac) | | TA | 0.17 | | TA | 0.17 |
| 3405 g each per 1000 lbs milk | 2094 g each | pH | 6.59 | | pH | 6.59 |
| Add Coagulant | 55 | Temp | 94.2° F. | 55 | Temp | 94.2° F. |
| Maxiren, Gtst Brocades, dbl str | | TA | 0.18 | | TA | 0.18 |
| 1.15 oz/1000 lbs or 34 ml/1000 lb | 21 ml | pH | 6.52 | | pH | 6.52 |
| Cut | 79 | TA | 0.12 | 79 | TA | 0.11 |
| ⅜" knives | | pH | 6.44 | pH | 6.46 | |
| Start Cooking | 95 | Temp | 93.1° F. | 95 | Temp | 93.2° F. |
| Reach Cooking Temp | 125 | Temp | 106.1° F. | 125 | Temp | 105.9° F. |
| | | TA | 0.11 | | TA | 0.11 |
| | c-pH | 6.33 | | w-pH | 6.33 | |
| | c-pH | 6.16 | | c-pH | 6.17 | |
| Drain | 155 | TA | 0.15 | 155 | TA | 0.15 |
| | | w-pH | 6.14 | | w-pH | 6.14 |
| | | c-pH | 5.87 | | c-pH | 5.88 |
| Cut and Turn | 165 | TA | — | 167 | TA | 0.19 |

TABLE 5-continued

| | | | | | | |
|---|---|---|---|---|---|---|
| Stack 2 high immediately | | c-pH | 5.82 | | c-pH | 5.77 |
| Mill | 210 | TA | — | 210 | TA | 0.24 |
| | | c-pH | 5.29 | | c-pH | 5.26 |
| Add Salt | 215 | curd wt | 61.5 lb | 217 | curd wt | 61.2 lb |
| 3.0% by curd weight | | salt wt | 838 g | | salt wt | 833 g |
| Mixer 170° F. | 225 | c-pH | 5.24 | 225 | c-pH | 5.23 |
| 10% brine | | | | | Mixer temp = 173° F. | |
| Mixer Speed 50 | | see additional sheet | | | Curd temp upon exit 173° F. | |
| Make Time (Coagulation to Mixer) | 170 | (2 h, 50 min) | | 173 | (2 h, 53 min) | |

TABLE 6

| | Vat 4 (112195-4) | | | Vat 5 (112195-5) | | |
|---|---|---|---|---|---|---|
| Operation | Time (min) | | pH or TA | Time (min) | | pH or TA |
| Initial Milk | Initial milk | | | | | |
| | Lynn), | TA | 0.17 | | TA | 0.17 |
| | 615 lb | pH | 6.54 | 615 lb | pH | 6.55 |
| Add Starter 1.5% (wt/wt) | 0 | Temp | 102.6° F. | 0 | Temp | 102.7° F. |
| 1:1 C90. R160(Thermolac) | | TA | 0.18 | | TA | 0.17 |
| 3405 g each per 1000 lbs milk | 2094 g each | pH | 6.49 | 2094 g each | pH | 6.49 |
| Add Coagulant | 95 | Temp | 102.3° F. | 95 | Temp | 102.3° F. |
| Maxiren, Glst Brocades, dbl str | | TA | 0.23 | | TA | 0.23 |
| 0.58 oz/1000 lbs or t7 ml/1000 lbs | | pH | 6.18 | | pH | 6.20 |
| Cut | 106 | TA | 0.15 | 105 | TA | 0.15 |
| ⅜" knives | | pH | 6.14 | | pH | 6.17 |
| Start Cooking | 115 | Temp | 101.7° F. | 115 | Temp | 101.7° F. |
| Reach Cooking Temp | 135 | Temp | 105.3° F. | 135 | Temp | 105.5° F. |
| | | TA | 0.17 | | TA | 0.16 |
| | | w.pH | 5.97 | | w-pH | 6.05 |
| | | c-pH | 5.74 | | c-pH | 5.82 |
| Drain | 135 | | | 145 | TA | 0.18 |
| | | | | w-pH | 5.95 | |
| | | | | c-pH | 5.72 | |
| Cut and Turn | 145 | TA | 0.22 | 155 | TA | — |
| Stack 2 high immediately | | c-pH | 5.57 | | c-pH | 5.55 |
| Mill | 170 | TA | 0.45 | 175 | TA | 0.45 |
| | | c-pH | 5.25 | | c-pH | 5.25 |
| Add Salt | 175 | curd wt | 52.5 lb | 180 | curd wt | 53.5 lb |
| 3.0% by curd weight | | salt wt | 715 g | | salt wt | 729 g |
| Mixer - Molder 190° F. | 185 | c-pH | — | 193 | c-pH | 5.22 |
| 10% brine | | | | | | |
| Mixer Speed 50 | | see additional sheet | | | see additional sheet | |
| Make time (Coagulation to Mixer) | 90 | (1 h, 30 min) | | 98 | (1 h, 38 min) | |

| | Vat 6 (112195-6) | | | LF Mozz Mean | | |
|---|---|---|---|---|---|---|
| Operation | Time (min) | | pH or TA | Time (min) | | pH or TA |
| Initial Milk | | | | | | |
| | | TA | 0.17 | | TA | 0.17 |
| | 615 lb | pH | 6.55 | | pH | 6.55 |
| Add Starter 1.5% (wt/wt) | 0 | Temp | 102.2° F. | 0 | Temp | 102.5° F. |
| 1:1 C90. R160(Thermolac) | | TA | 0.17 | | TA | 0.17 |
| 3405 g each per 1000 lbs milk | 2094 g each | pH | 6.49 | | pH | 6.49 |
| Add Coagulant | 110 | Temp | 102.4° F. | 100 | Temp | 102.3° F. |
| Maxiren, Glst Brocades, dbl str | | TA | 0.23 | | TA | 0.23 |
| 0.58 oz/1000 lbs or t7 ml/1000 lbs | | pH | 6.21 | | pH | 6.20 |
| Cut | 121 | TA | 0.15 | 111 | TA | 0.15 |
| ⅜" knives | | pH | 6.18 | | pH | 6.16 |
| Start Cooking | 130 | Temp | 101.3° F. | 120 | Temp | 101.6° F. |
| Reach Cooking Temp | 145 | Temp | 106.1° F. | 138 | Temp | 105.6° F. |
| | | TA | 0.17 | | TA | 0.17 |
| | | w-pH | 5.98 | | w-pH | 6.00 |
| | | c-pH | 5.77 | | c-pH | 5.78 |
| Drain | 145 | | | 142 | TA | 0.06 |
| | | | | w-pH | 1.98 | |
| | | | | c-pH | 1.91 | |
| Cut and Turn | 155 | TA | — | 152 | TA | 0.22 |
| Stack 2 high immediately | | c-pH | 5.54 | | c-pH | 5.55 |
| Mill | 180 | TA | — | 175 | TA | 0.45 |
| | | c-pH | 5.26 | | c-pH | 5.25 |
| Add Salt | 185 | curd wt | 54.5 lb | 180 | curd wt | 53.5 lb |
| 3.0% by curd weight | | salt wt | 742 g | | salt wt | 729 g |

TABLE 6-continued

| | | | | | | |
|---|---|---|---|---|---|---|
| Mixer - Molder 190° F. | 197 | c-pH | 5.16 | 192 | c-pH | 5.19 |
| 10% brine | | | | | | |
| Mixer Speed 50 | | | see additional sheet | | | |
| Make time (Coagulation to Mixer) | 87 | | (1 h, 27 min) | 92 | (1 h, 32 min) | |

TABLE 7

| | | | | LMPS Pizza | | | | LF Pizza |
|---|---|---|---|---|---|---|---|---|
| | 112095-1 | 112095-2 | 112095-3 | Mean | 112095-4 | 112095-5 | 112095-6 | Mean |
| % Moisture @ 1 week | 46.86 | 46.43 | 47.72 | 47.01 | 54.18 | 54.73 | 54.69 | 54.53 |
| % Moisture @ 1 month | 47.33 | 46.87 | 47.03 | 47.08 | 53.11 | 53.90 | 53.74 | 53.38 |
| % Fat (mojo) | 22.35 | 22.71 | 21.84 | 22.30 | 8.42 | 8.53 | 8.42 | 8.45 |
| % Salt | 1.69 | 1.69 | 1.69 | 1.63 | 1.99 | 1.46 | 1.48 | 1.65 |
| % Protein | 26.97 | 26.93 | 27.78 | 27.23 | 33.52 | 32.35 | 33.69 | 33.16 |
| Component total | 98.02 | 97.98 | 98.69 | 98.22 | 97.57 | 96.67 | 97.72 | 97.32 |
| % MNFS | 69.35 | 69.08 | 61.06 | 69.49 | 59.16 | 59.83 | 59.71 | 59.57 |
| % FDM | 42.05 | 42.39 | 41.78 | 42.08 | 18.37 | 18.84 | 18.58 | 18.69 |
| % S/M | 3.41 | 3.64 | 3.35 | 3.47 | 3.67 | 2.70 | 2.71 | 3.03 |
| | | | | LMPS Mozz | | | | LF Mozz |
| | 112195-1 | 112195-2 | 112195-3 | Mean | 112195-4 | 112195-5 | 112195-6 | Mean |
| % Moisture @ 1 week | 46.00 | 46.40 | 46.69 | 46.36 | 54.20 | 53.69 | 54.01 | 53.97 |
| % Moisture @ 1 month | 46.43 | 46.16 | 47.11 | 46.56 | 54.59 | 53.77 | 54.28 | 54.21 |
| % Fat (mojo) | 21.82 | 21.81 | 21.67 | 21.70 | 6.98 | 7.43 | 7.49 | 7.30 |
| % Salt | 1.41 | 1.69 | 1.58 | 1.53 | 1.54 | 1.66 | 1.64 | 1.61 |
| % Protein | 27.40 | 28.06 | 27.15 | 27.54 | 33.39 | 34.12 | 34.14 | 33.88 |
| | 96.84 | 97.56 | 97.30 | 97.23 | 96.30 | 96.93 | 97.41 | 96.88 |
| % MNFS | 58.83 | 59.20 | 59.69 | 59.21 | 58.27 | 58.00 | 58.39 | 58.22 |
| % FDM | 40.40 | 40.32 | 40.64 | 40.45 | 15.24 | 16.03 | 16.28 | 15.85 |
| % SIM | 3.07 | 3.45 | 3.38 | 3.30 | 2.84 | 3.09 | 3.04 | 2.99 |
| | | | | LMPS Pizza | | | | LF Pizza |
| | 112095-1 | 112095-2 | 112095-3 | Mean | 112095-4 | 112095-5 | 112095-6 | Mean |
| 1 day | 5.11 | 5.20 | 5.19 | 5.17 | 5.40 | 5.25 | 5.22 | 5.28 |
| 7 days | 5.05 | 5.02 | 5.02 | 5.03 | 5.07 | 5.05 | 4.97 | 5.03 |
| 14 days | 5.17 | 5.14 | 5.10 | 5.14 | 5.15 | 5.19 | 5.09 | 5.14 |
| 30 days | 5.18 | 5.20 | 5.18 | 5.19 | 5.21 | 5.24 | 5.19 | 5.21 |
| 90 days | 5.19 | 5.23 | 5.18 | 5.20 | 5.21 | 5.26 | 5.15 | 5.21 |
| | | | | LMPS Mozz | | | | LF Mozz |
| | 112195-1 | 112195-2 | 112195-3 | Mean | 112195-4 | 112195-5 | 112195-6 | Mean |
| 1 day | 5.15 | 5.24 | 5.24 | 5.21 | 5.15 | 5.17 | 5.16 | 5.16 |
| 7 days | 5.22 | 5.26 | 5.23 | 5.24 | 5.16 | 5.24 | 5.19 | 5.20 |
| 14 days | 5.19 | 5.15 | 5.29 | 5.21 | 5.14 | 5.14 | 5.20 | 5.19 |
| 39 days | 5.24 | 5.24 | 5.40 | 5.29 | 5.21 | 5.33 | 5.29 | 5.28 |
| 90 days | 5.18 | 5.23 | 5.27 | 5.13 | 5.24 | 5.24 | 5.24 | 5.24 |

What is claimed is:

1. A method of manufacturing pasta filata-simulative cheese comprising:

a) pre-acidifying milk; then b) ripening the milk with a mesophilic starter culture to yield cheese milk; then c) coagulating the cheese milk by adding a reduced amount of a coagulant to the cheese milk, the reduced amount being no more than about 0.58 ounces double-strength coagulant per 1000 pounds milk, to yield a coagulum; then d) cutting the coagulum to yield curds and whey; then e) separating the curds from the whey and washing the curds in water; and then f) proceeding directly to salt, hoop, and press the curds in the absence of any milling, mixing, or molding of the curds.

2. The method of claim 1, wherein in step a) the milk is pre-acidified to from about pH 6.65 to about pH 6.30.

3. The method of claim 1, wherein in step a) the milk is pre-acidified to about pH 6.3.

4. The method of claim 1, wherein in step a) the mill is pre-acidified by the addition of acetic acid, lactic acid, or a combination thereof.

5. The method of claim 1, wherein in step b) the milk is ripened with a starter culture selected from the group consisting of Lactococcus lactis subsp. lactis, Lactococcus lactis subsp. cremoris, and mixtures thereof.

6. The method of claim 1, wherein in step b) the milk is ripened with Lactococcus lactis subsp. cremoris.

7. The method of claim 1, wherein in step e) the curds are washed with water having a temperature of about 65° F.

8. The method of claim 1, wherein after the washings in step e), the curds have a pH of from about 5.8 to about 6.0.

9. The method of claim 1, wherein after the washing in step e), the curds have a pH of about 5.9.

10. A pizza cheese which is functionally and organoleptically simulative of pasta filata cheeses, but which does not require mixing or molding step in its manufacture, the pizza cheese produced by:

a) pre-acidifying milk; then b) ripening the milk with a mesophilic starter culture to yield cheese milk; then c) coagulating the cheese milk by adding a reduced amount of a coagulant to the cheese milk, the reduced amount being no more than about 0.58 ounces double-strength coagulant per 1000 pounds milk, to yield a coagulum; then d) cutting the coagulum to yield curds and whey; then e) separating the curds from the whey and washing the curds in water; and then f) proceeding directly to salt, hoop, and press the curds in the absence of any milling, mixing, or molding of the curds.

11. The pizza cheese of claim 10, wherein in step a) the milk is pre-acidified to from about pH 6.65 to about pH 6.30.

12. The pizza cheese of claim 10, wherein in step a) the milk is pre-acidified to about pH 6.3.

13. The pizza cheese of claim 10, wherein in step a) the milk is pre-acidified by the addition of acetic acid, lactic acid, or a combination thereof.

14. The pizza cheese of claim 10, wherein in step b) the milk is ripened with a starter culture selected from the group consisting of Lactococcus lactis subsp. lactis, Lactococcus lactis subsp. cremoris, and mixtures thereof.

15. The pizza cheese of claim 10, wherein in step b) the milk is ripened with Lactococcus lactis subsp. cremoris.

16. The pizza cheese of claim 10, wherein in step e) the curds are washed with water having a temperature of about 65° F.

17. The pizza cheese of claim 10, wherein after the washing in step e), the curds have a pH of from about 5.8 to about 6.0.

18. The pizza cheese of claim 10, wherein after the washing in step e), the curds have a pH of about 5.9.

*19. A method of manufacturing pasta filata-simulative cheese comprising:*

*a) ripening milk with a mesophilic starter culture to yield cheese milk; then*

*b) coagulating the cheese milk by adding a reduced amount of a coagulant to the cheese milk, the reduced amount being no more than about 0.58 ounces double-strength coagulant per 1000 pounds milk, to yield a coagulum; then*

*c) cutting the coagulum to yield curds and whey; then*

*d) separating the curds from the whey and washing the curds in water; and then*

*e) proceeding directly to salt, hoop, and press the curds in the absence of any milling, mixing, or molding of the curds.*

*20. The method of claim 19, wherein in step a) the milk is ripened with a starter culture selected from the group consisting of Lactococcus lactis subsp. lactis, Lactococcus lactis subsp. cremoris, and mixtures thereof.*

*21. The method of claim 19, wherein in step a) the milk is ripened with Lactococcus lactis subsp. cremoris.*

*22. The method of claim 19, wherein in step d) the curds are washed with water having a temperature of about 65° F.*

*23. The method of claim 19, wherein after the washing in step d), the curds have a pH of from about 5.8 to about 6.0.*

*24. The method of claim 19, wherein after the washing in step d), the curds have a pH of about 5.9.*

*25. A pizza cheese which is functionally and organoleptically simulative of pasta filata cheeses, but which does not require mixing or molding step in its manufacture, the pizza cheese produced by:*

*a) ripening milk with a mesophilic starter culture to yield cheese milk; then*

*b) coagulating the cheese milk by adding a reduced amount of a coagulant to the cheese milk, the reduced amount being no more than about 0.58 ounces double-strength coagulant per 1000 pounds milk, to yield a coagulum; then*

*c) cutting the coagulum to yield curds and whey; then*

*d) separating the curds from the whey and washing the curds in water; and then*

*e) proceeding directly to salt, hoop, and press the curds in the absence of any milling, mixing, or molding of the curds.*

*26. The pizza cheese of claim 25, wherein in step a) the milk is ripened with a starter culture selected from the group consisting of Lactococcus lactis subsp. lactis, Lactococcus lactis subsp. cremoris, and mixtures thereof.*

*27. The pizza cheese of claim 25, wherein in step a) the milk is ripened with Lactococcus lactis subsp. cremoris.*

*28. The pizza cheese of claim 25, wherein in step d) the curds are washed with water having a temperature of about 65° F.*

*29. The pizza cheese of claim 25, wherein after the washing in step d), the curds have a pH of from about 5.8 to about 6.0.*

*30. The pizza cheese of claim 25, wherein after the washing in step d), the curds have a pH of about 5.9.*

* * * * *